(12) United States Patent
Ashwood-Smith et al.

(10) Patent No.: US 6,791,985 B1
(45) Date of Patent: Sep. 14, 2004

(54) ATM TRANSPORT OVER MULTI-PROTOCOL LABEL SWITCHING

(75) Inventors: Peter J. Ashwood-Smith, Hull (CA); Bernard F. St-Denis, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 910 days.

(21) Appl. No.: 09/614,601

(22) Filed: Jul. 12, 2000

(51) Int. Cl.[7] .............................................. H04L 12/28
(52) U.S. Cl. ................................ 370/395.5; 370/395.1
(58) Field of Search ............................... 370/351, 395.1, 370/395.5, 395.52, 395.6, 401; 709/230, 249

(56) References Cited

U.S. PATENT DOCUMENTS

| | | | | |
|---|---|---|---|---|
| 5,623,605 A | * | 4/1997 | Keshav et al. ............... | 370/401 |
| 6,477,166 B1 | * | 11/2002 | Sanzi et al. ............... | 370/395.1 |
| 6,522,667 B1 | * | 2/2003 | Oda et al. ............... | 370/395.52 |
| 6,574,224 B1 | * | 6/2003 | Brueckheimer et al. . | 370/395.6 |
| 6,603,756 B1 | * | 8/2003 | Tappan ........................ | 370/351 |
| 6,628,649 B1 | * | 9/2003 | Raj et al. .................. | 370/395.1 |
| 6,633,571 B1 | * | 10/2003 | Sakamoto et al. .......... | 370/401 |

OTHER PUBLICATIONS

*Multiprotocol Label Switching Architecture*, draft–ietf–mpls–arch–06.txt,Network Working Group, Internet Draft, Expiration Date—Feb. 2000, Eric C. Rosen, Arun Viswanathan, Ross Callon, Aug. 1999.

* cited by examiner

*Primary Examiner*—Salvatore Cangialosi

(57) ABSTRACT

User traffic of one type must traverse many diverse networks, each operating by different paradigms and requiring different protocol stacks, before it reaches the destination. MPLS (Multiprotocol Label Switching) is being developed to solve some of the problems which involve the existence of different protocols along the traffic path. There is currently no accepted way of transporting ATM cells over an MPLS domain. New ways of packetizing ATM cells into labeled MPLS packets for transporting over an MPLS domain are described.

60 Claims, 15 Drawing Sheets

Datapath Flow

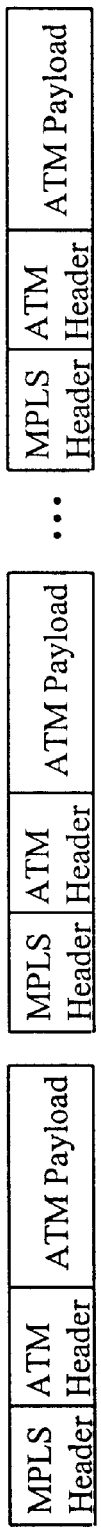
*Fig 6*
*Fig 7*
*Fig 8*
*Fig 9*

C: ATM Common Header (1 byte)

ATM Common Header (1 byte)

| ATM Common Header: | CLP | VCC/VPC | Cell/Frame | APTI | | VCI |
|---|---|---|---|---|---|---|
| | | | | | | See Figure 13 |

| ATM Payload VCC Single | ATM Payload VCC Bundle | Frame Payload VCC SSM | Frame Payload VCC SSM with UU/CPI | Frame Payload VCC SSM with Padding and UU/CPI | Frame Payload VCC BOM or COM | Frame Payload VCC EOM | Frame Payload VCC SSM with UU/CPI | Frame Payload VCC SSM with Padding and UU/CPI |
|---|---|---|---|---|---|---|---|---|
| | B Hdr | | UU CPI | 0-47 bytes padding | | Length | UU CPI | 0-47 bytes padding |
| | ATM Payload | | | UU CPI | | AAL5 CRC | Length | UU CPI |
| | . . | | | Length | | | AAL5 CRC | Length |
| | N x bundles | | | | | | | AAL5 CRC |
| | B Hdr | | | | | | | |
| | ATM Payload | | | | | | | |

*Fig 12*

ATM TRANSPORT OVER MULTI-PROTOCOL LABEL SWITCHING

FIELD OF INVENTION

The invention relates to transport of data in ATM format between ATM networks over a multi-protocol communications network using multi-protocol label switching.

BACKGROUND OF INVENTION

There are a large number of communications networks of different kinds, each being designed specifically for different purposes. These networks converge form a large network. User traffic of one type must traverse many diverse networks, each operating by different paradigms and requiring different protocol stacks, before it reaches the destination. MPLS (Multiprotocol Label Switching) is being developed to solve some of the problems which involve the existence of different protocols along the traffic path.

For example, as a packet of a connectionless network layer protocol, such as Internet protocol, travels from one router to the next, each router makes an independent forwarding decision for that packet. Each router analyzes the packet's header, and each router runs a network layer routing algorithm. Each router independently chooses a next hop for the packet, based on its analysis of the packet's header and the results of running the routing algorithm.

Packet headers contain considerably more information than is needed simply to choose the next hop. Choosing the next hop can therefore be thought of as the composition of two functions. The first function partitions the entire set of possible packets into a set of "Forwarding Equivalence Classes (FECs)". The second maps each FEC to a next hop. Insofar as the forwarding decision is concerned, different packets which get mapped into the same FEC are indistinguishable. All packets which belong to a particular FEC and which travel from a particular node will follow the same path (or if certain kinds of multi-path routing are in use, they will all follow one of a set of paths associated with the FEC).

In conventional IP forwarding, a particular router will typically consider two packets to be in the same FEC if there is some address prefix X in that router's routing tables such that X is the "longest match" for each packet's destination address. As the packet traverses the network, each hop in turn reexamines the packet and assigns it to a FEC.

MPLS is being developed as a technique which attempts to use the network resources, such as bandwidth, more efficiently, while preserving services, e.g., QoS. It can carry any network layer protocol.

IETF-MPLS-ARC-06 "Multiprotocol Label Switching Architecture" by Rosen et al, August 1999 describes in detail the architecture of MPLS.

In MPLS, the assignment of a particular packet to a particular FEC is done just once, as the packet enters the network. The FEC to which the packet is assigned is encoded as a short fixed length value known as a "label". When a packet is forwarded to its next hop, the label is sent along with it; that is, the packets are "labeled" before they are forwarded.

At subsequent hops, there is no further analysis of the packet's network layer header. Rather, the label is used as an index into a table which specifies the next hop, and a new label. The old label is replaced with the new label, and the packet is forwarded to its next hop.

In the MPLS forwarding paradigm, once a packet is assigned to a FEC, no further header analysis is done by subsequent routers; all forwarding is driven by the labels. MPLS uses a label to encapsulate the native traffic and forms a labeled packet. Each MPLS node switches labeled packets to a next MPLS node using labels. An MPLS packet traverses different kinds of networks one after another before it reaches the destination MPLS node which converts the packet back to its native form. It should also be noted that MPLS labels are in a fixed length which may be 0 bytes long in some environment. For example, MPLS packets can be transported through a time-slotted link e.g., TDM (time division multiplex) link. In such a case, MPLS packets are mapped at a specified timeslot on the link. Once such a link is established for MPLS traffic, MPLS packets no longer need to carry MPLS labels.

It should be emphasized that effort has been made to differentiate "encapsulating a payload into an MPLS labeled packet", "placing a payload into an MPLS labeled packet", "packetizing into an MPLS packet" and other similar expressions. It may however be possible that "encapsulating a payload into an MPLS labeled packet" at some location could mean "encapsulating a payload into an MPLS labeled packet with a 0-byte label", i.e., "placing a payload into an MPLS labeled packet".

Customer payload comes in a variety of formats and an MPLS node must analyze it so that it can insert the payload into MPLS labeled packets with MPLS packet label having sufficient information for forwarding them properly to the next MPLS node. The MPLS packets, therefore, can be transported over different media e.g., ATM, Frame Relay, TDM, DWDM (Dense Wavelength Division Multiplex), LAN (Ethernet etc.), etc. MPLS therefore forms one MPLS domain, encompassing a variety of different kinds of networks. This has a number of advantages over conventional network layer forwarding.

As shown in FIG. 1, MPLS therefore enables to form one multiservice MPLS domain which encompasses a number of diverse networks, such as IP, ATM, Frame Relay, TDM, DWDM, LAN etc. Unlike other network, e.g., ATM, LAN, etc., the MPLS domain is easily scaled-up in terms of the number of connections, bandwidth administration, failure (error) management etc. In FIG. 1, an MPLS domain 10 can be made up of aggregation of different networks 12. Nodes 14 and 16 at the edge of the MPLS domain contains MPLS capabilities and function as MPLS nodes handling a variety of traffic to and from external networks which include TDM, LAN, IP, Frame Relay, IP, ATM etc. In the Figure nodes 14 are communicating with one another in ATM traffic.

In one form, transport of the MPLS packet between two MPLS capable nodes is performed by such a link layer protocol as PPP (point-to-point protocol). Other link layer protocols can be envisaged for this purpose with appropriate modifications. The PPP (Point-to-Point Protocol) is well known in the field of data communication. Briefly stated, however, the PPP is designed for simple links which transport packets between two peers. These links provide full-duplex simultaneous bidirectional operation, and are assumed to deliver packets in order. The PPP consists of a way of encapsulating multi-protocol datagrams, a Link Control Protocol (LCP) for establishing, configuring, and testing the data-link connection and a family of Network Control Protocol (NCPs) for establishing and configuring different network-layer protocols. This protocol is capable of transporting MPLS packets between two MPLS capable nodes.

In order to transport ATM cells from one ATM network to another over an MPLS domain, MPLS packets must be generated at the ingress of the MPLS domain and must be converted back to ATM cell at the egress of the MPLS domain. However, if the entire ATM cell is to be encapsulated in a MPLS labeled packet, there would be a large number of bytes wasted. There exists no suitable method or system which is capable of placing ATM cells into MPLS labeled packets.

SUMMARY OF INVENTION

The present invention addresses problems of placing ATM cells into MPLS labeled packets so that ATM cells are properly transported over networks and can be regenerated at the destination MPLS node, without loss of ATM services. By this invention, therefore, ATM cells can be formed into a self-describing MPLS packet which carry necessary information concerning transmitting it over an MPLS domain to a proper destination MPLS node.

In accordance with one aspect, the invention is directed to a method of transporting ATM cells between two nodes over a multiprotocol label switching domain, hereinafter called an MPLS domain. The method comprises steps of reading an ATM header to obtain attributes of an ATM cell received at a first node, the attributes of the ATM cell including a type of ATM payload. The method further comprises steps of generating an ATM common header for the ATM cell, the ATM common header mapping the type of ATM payload and other attributes of the ATM cell, generating an MPLS labeled packet which includes the ATM common header and the ATM payload, the MPLS labeled packet containing routing information to a second node, and transmitting the MPLS labeled packet to the second node.

In accordance with another aspect, the invention is directed to a method of transporting one or more ATM cells over a multiprotocol label switching domain, hereinafter called an MPLS domain. The method comprises steps of determining at a source node that the one or more ATM cells are of an AAL5 frame and are destined to a destination node of the MPLS domain, applying a common header to the payload of each ATM cell, the common header indicating attributes of each payload, the attributes of each payload including that the payload is a frame payload and a type of message of the payload, generating an MPLS labeled packet which includes the common header and the frame payload, the MPLS labeled packet mapping information concerning the destination node, and transmitting the MPLS labeled packet to the destination node.

In accordance with a yet further aspect, the invention is directed to an apparatus for transporting ATM cells between two nodes over a multiprotocol label switching domain, hereinafter called an MPLS domain. The apparatus comprises an ATM header reader, a reassembly module and a forwarder. The ATM header reader is provided for reading an ATM header to obtain attributes of a received ATM cell, the attributes including a type of ATM payload. The reassembly module is provided for generating an ATM common header for the ATM cell, the ATM common header mapping the type of ATM payload and other attributes of the ATM cell. The forwarder is provided for generating an MPLS labeled packet which includes the ATM common header and the ATM payload. The MPLS labeled packet contains forwarding information to a second node.

The apparatus may also comprise a transmitter for transmitting the MPLS labeled packet to the second node.

In accordance with a yet further aspect, the invention is directed to a method for generating a multiprotocol label switching (MPLS) labeled packet suitable for transmitting one or more ATM cells between two nodes over an MPLS domain. The method comprises steps of reading an ATM header to obtain attributes of an ATM cell received at a first node, the attributes of the ATM cell including a type of ATM payload. The method further comprises steps of generating an ATM common header for the ATM cell, the ATM common header mapping the type of ATM payload and other attributes of the ATM cell, and generating an MPLS labeled packet which includes the ATM common header and the ATM payload, the MPLS labeled packet containing routing information to a second node.

In accordance with a yet further aspect, the invention is directed to an computer readable medium storing instructions or statements for use in the execution in a computer of a method for generating a multiprotocol label switching (MPLS) labeled packet suitable for transmitting one or more ATM cells between two nodes over an MPLS domain. The method comprises steps of reading an ATM header to obtain attributes of an ATM cell received at a first node, the attributes of the ATM cell including a type of ATM payload. The method further comprising steps of generating an ATM common header for the ATM cell, the ATM common header mapping the type of ATM payload and other attributes of the ATM cell, and generating an MPLS labeled packet which includes the ATM common header and the ATM payload, the MPLS labeled packet containing routing information to a second node.

BRIEF DESCRIPTION OF DRAWINGS

A better understanding of the invention will be obtained by reading the description of the invention below, with reference to the following drawings in which:

FIG. 6 shows the first way of constructing MPLS packets from ATM cells.

FIG. 7 shows the second way of constructing MPLS packets from ATM cells.

FIG. 8 shows the third way of constructing MPLS packets from ATM cells.

FIG. 9 shows the fourth way of constructing MPLS packets from ATM cells.

FIGS. 12 and 13 show a variety of ATM payload formats that can be encapsulated according to embodiments of the invention.

DETAILED DESCRIPTION OF PREFERRED EMBODIMENTS OF INVENTION

Figure 1:
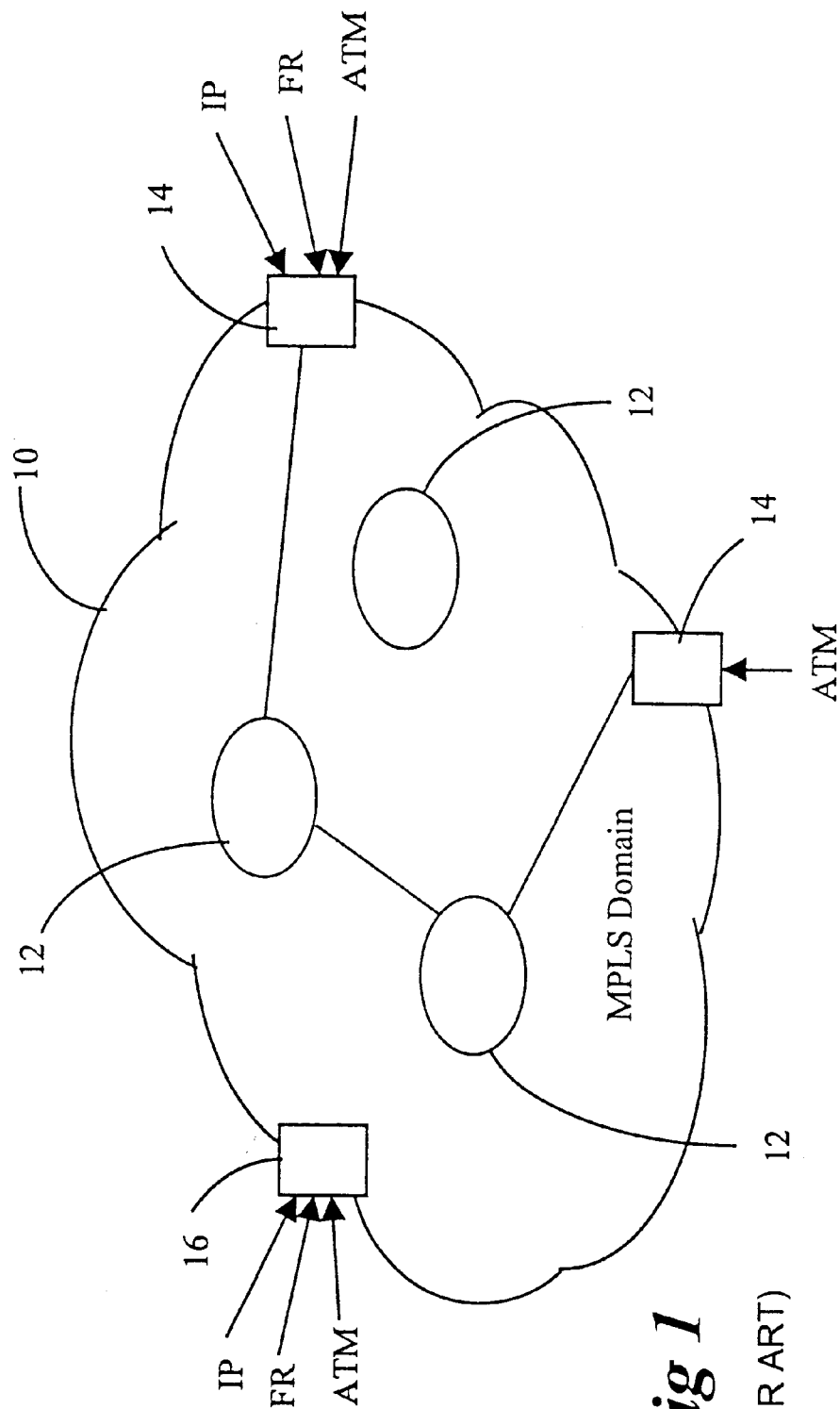
FIG. 1 shows an MPLS domains provided with edge nodes and containing diverse networks.
Figure 1A:
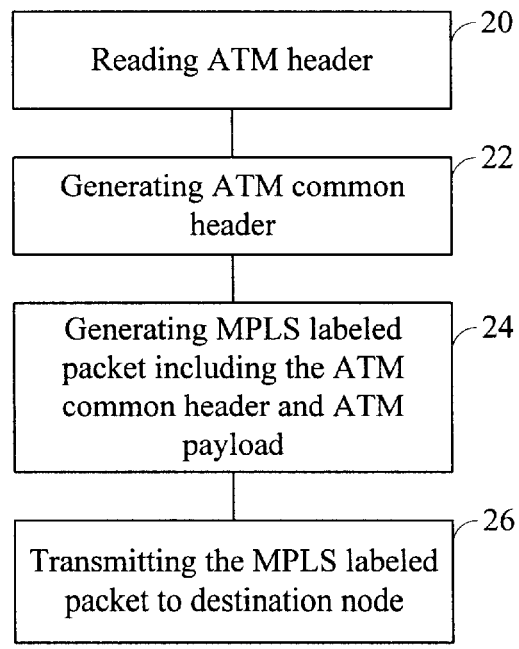
FIG. 1A is a flowchart showing a method for generating a MPLS labeled packet and transmitting the same in accordance with an embodiment of the present invention.

FIG. 1A shows a method in accordance with an embodiment of the present invention to generate a packet for transporting or transmitting an ATM cell from a source node to a destination node over a multiprotocol label switching (MPLS) domain. As shown in FIG. 1A, an ATM header is read to obtain attributes of an ATM cell received at a first node (20). The attributes of the ATM cell include a type of ATM payload. An ATM common header is generated for the ATM cell (22). The ATM common header maps the type of ATM payload and other attributes of the ATM cell. Then, an MPLS labeled packet is generated to include the ATM common header and the ATM payload (24). The generated MPLS labeled packet is transmitted to the destination node (26).

Figure 1B:
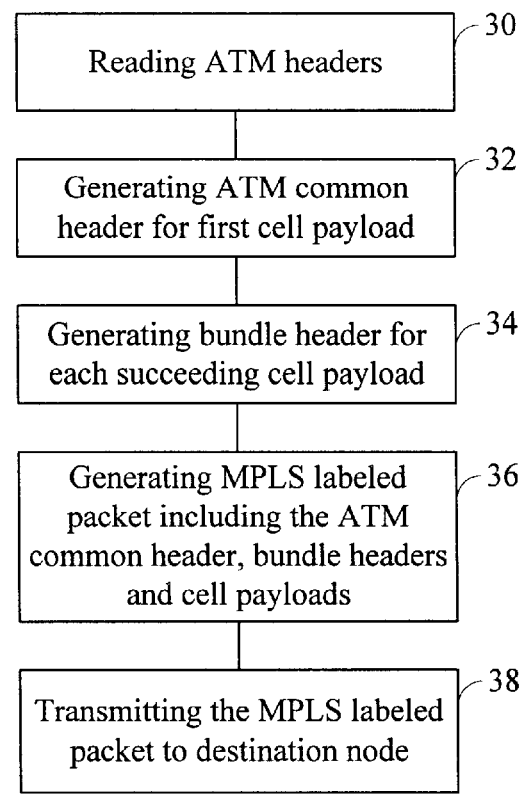
FIG. 1B is a flowchart showing a method for generating a MPLS labeled packet and transmitting the same in accordance with another embodiment of the present invention.

When the attributes of the ATM cell indicates that a plurality of cell payloads are bundled, as shown in FIG. 1B, a plurality of ATM headers received at the source node are read to obtain attributes of the cell payloads (30). An ATM common header for the first cell payload is generated (32). The ATM common header maps the attributes of the first cell payload. For each of succeeding cell payloads, a bundle header is generated to map payload type indicators of the succeeding cell payloads (34). Then, an MPLS labeled packet is generated to include the ATM common header, bundle headers and cell payloads (36). The generated MPLS labeled packet is transmitted to destination node (38).

Prior to describe these steps further in detail, the features of ATM cells and MPLS packets are described to aid understanding of the present invention.

Figure 2:
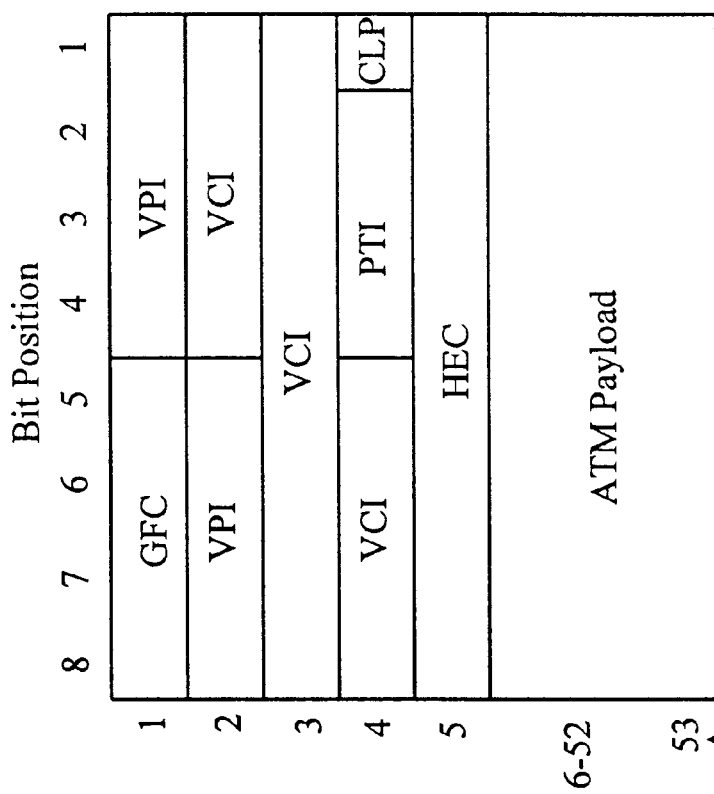
FIG. 2 is an ATM cell format.

FIG. 2 shows an ATM cell format. In the Figure, the first 5 bytes are the ATM cell header which consists of six fields, GFC (Generic Flow Control), VPI (Virtual Path Identifier), VCI (Virtual Channel Identifier), PTI (Payload Type Indicator), CLP (Cell Loss Priority) and HEC (Header Error Control). The payload field has 48 bytes.

Figure 3:
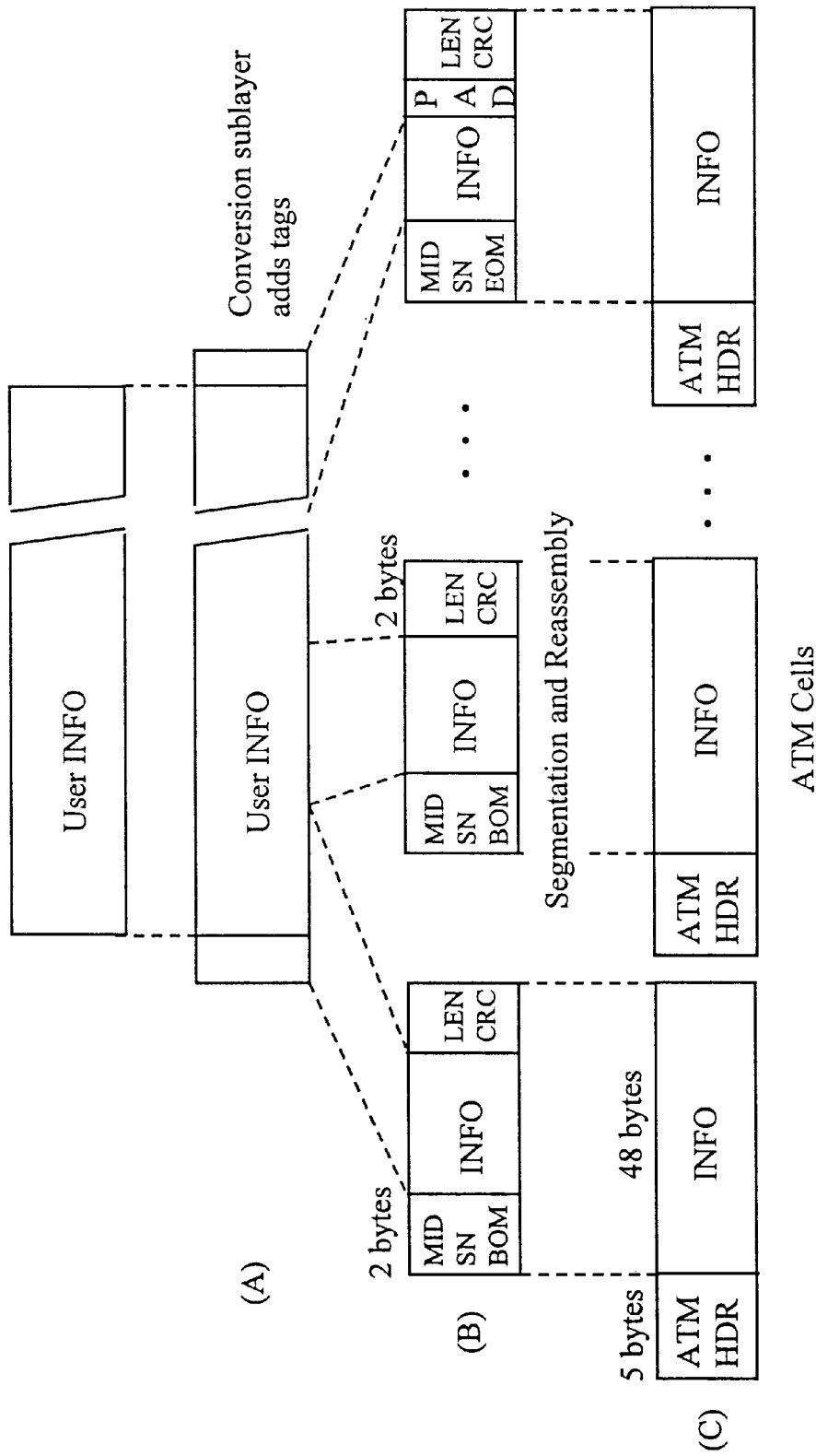
FIG. 3 illustrates the construction of ATM cells in accordance with AAL3/4 protocol.

There are a few subsets of ATM transport in use, e.g., AAL1, AAL2, AAL3/4, AAL5, other proprietary ones, etc. FIG. 3 shows how user frame is encapsulated into ATM cells and is transported in accordance with AAL3/4. (A): After having been encapsulated with tags for the beginning and the end, user information (user INFO) in packets or frames is segmented into a series of packets 48 bytes each at (B). (B): Each packet carries a header and a tail, both having fixed length (e.g. 2 bytes each). The header contains fields which indicate MID (Message IDentifier), SN (Sequence Number) and BOM (Beginning Of Message) or EOM (End Of Message). The tail contains fields which represent LEN (Length) and CRC. The last packet of the series may contain a PAD (padding). (C): Each packet of the series is encapsulated with a 5 byte ATM HDR (ATM header) for transport. In this format, the payload of each ATM cell is considered cell payload because the payload contains essential cell information. The cell information is needed to reassemble payloads.

Figure 4:
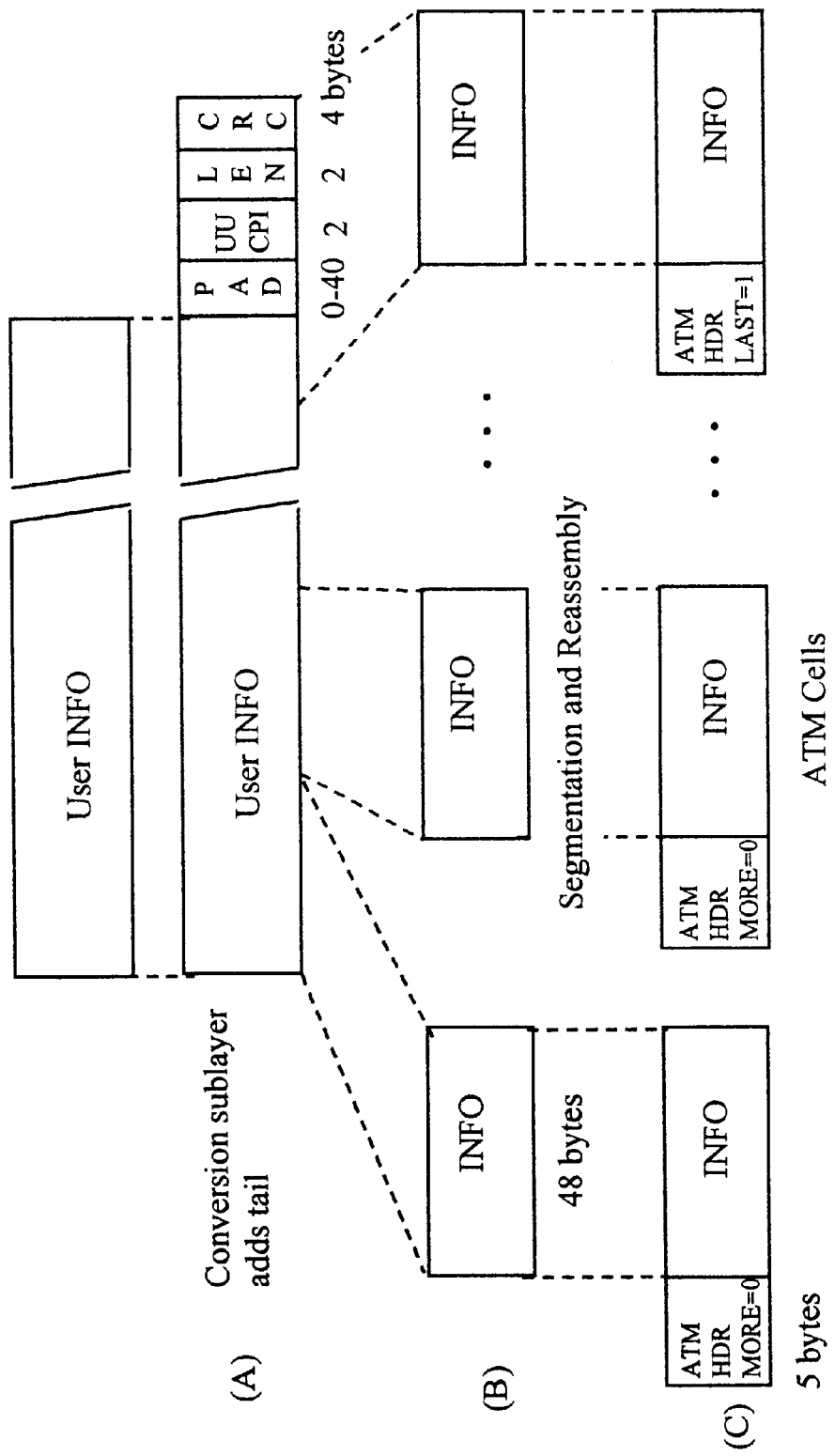
FIG. 4 illustrates the construction of ATM cells in accordance with AAL5 protocol.

FIG. 4, on the other hand, illustrates how AAL5 cells are transported. (A): User information in packets or frames is first encapsulated by a trailer which consists of PAD, LEN, UU/CPI and CRC fields of fixed bytes. The padding can be any length between 0 and 47 bytes. UU/CPI are 1 byte each and are for user-to-user information and ATM common part indicator respectively. (B): The user information and the trailer are segmented into a series of packets of 48 bytes each. (C): Each packet is provided with an ATM header, one of whose fields is used to indicate either "More" or "Last". "More" represents more ATM cells from this datagram to come and "Last" the last cell of this datagram. Contrary to AAL3/4, this format is considered frame payload because payload does not contain cell information but assumes that each payload is a part of a frame and arrives in sequence at the destination for reassembly of payloads.

Figure 5:
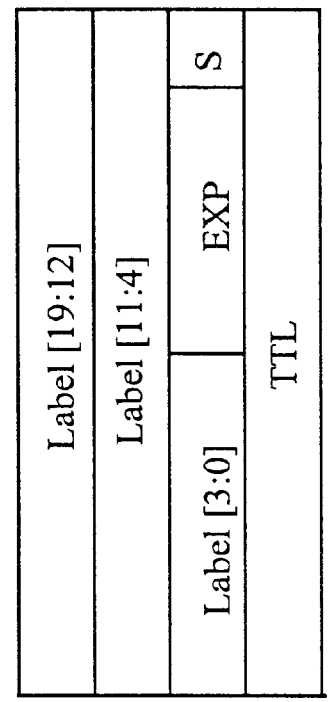
FIG. 5 is an MPLS header format.

FIG. 5 shows an MPLS header (label) format according to one embodiment. The header consists of 4 bytes of which 20 bits are label fields to specify the next MPLS node. TTL is a field to indicate the duration of time for the packet to live and S is set to indicate that the packet is the bottom of the stack or not. EXP has three bits set aside for experimental purposes. As mentioned earlier, the MPLS header has a prefixed length between 0 and 4 bytes.

There are several mechanisms for forming MPLS packets with ATM cells.

1) The entire ATM cell complete with ATM header is treated as an MPLS payload. Therefore each entire ATM cell (53 bytes) is encapsulated and is given an MPLS label (4 bytes). FIG. 6 shows this arrangement of transport. This results in 9 bytes (4 bytes of MPLS label and 5 bytes of ATM header) of overhead for every 48 bytes of ATM payload transported. If the ATM cells are actually of an AAL5 segmented frame, then possibly further 55 bytes may be wasted in the last cell because PAD, UU, CPI, AAL5 CRC and length are not needed.

2) The ATM cell minus HEC is treated as an MPLS payload and is encapsulated into an MPLS packet with an MPLS label. FIG. 7 shows this arrangement of transport. The HEC can be regenerated at the egress of the MPLS domain. This results in 8 bytes (4 byte in MPLS label and 4 bytes of ATM header) of overhead for every 48 bytes transported. Like case (1) above, this may result in possibly 55 bytes wasted in the last cell if the ATM cells are actually of an AAL5 segmented frame.

3) If ATM cells are of an AAL5 frame, these cells without headers can be treated as an MPLS payload and each can be encapsulated into an MPLS packet with an MPLS label. No ATM headers of cells are encapsulated into the MPLS packet. FIG. 8 shows this arrangement of transport. This is difficult, however, if not impossible, because there is not enough bits available to map PTI and CLP in a MPLS label. As seen in FIG. 5, in MPLS label there are only three experimental bits set aside which can be used for this purpose, whereas there are four bits of CLP and PTI in the ATM header which must be captured to distinguish ATM signalling, etc. Furthermore, VPC cannot be supported in this scheme.

4) ATM cells with the same header are bundled together and encapsulated into an MPLS packet with one copy of ATM header and an MPLS label. This will reduce the overhead arbitrarily by the number of ATM cells to bundle, but will consequently result in increase (arbitrarily) in the buffering delay and the buffer sizes. This characteristics may not be critical for some type of traffic. For example, this is bad to CBR traffic but is not critical to UBR traffic. FIG. 9 shows this arrangement of transport. The ATM cells which are bundled into an MPLS packet must be identical in VCI and VPI fields of the ATM header. The content therefore includes VCI and VPI in addition to PTI and CLP. The latter two fields may vary in value among cells but VCI and VPI values must be same. Bundling becomes very inefficient and introduces unnecessary delays.

Figure 10:
FIG. 10 shows yet another way of constructing MPLS packets from ATM cells according to one embodiment of the invention.

(5) One or more ATM cells with same VPI or VPI/VCI value can be encapsulated into an MPLS packet with an MPLS label mapping the VPI and VCI values. An additional byte (called ATM common header) is added in the MPLS packet. The additional byte indicates the type of ATM cells encapsulated in the MPLS packet. FIG. 10 shows this arrangement of transport according to one embodiment of the invention where only one ATM cell is placed in one MPLS packet. As will be described in detail below, more than one ATM cells with same VPI or VPI/VCI values can be placed in one MPLS packet with according to this invention. In such a case, in addition to an ATM common header, each ATM cell payload is attached with a bundle header which will be described in detail below. Contrary to case (4) above, the ATM cells can be from different data streams or from the same one, as long as they are to be transported to the same MPLS node.

It should be emphasized that the MPLS label can vary in size from 0 bytes to 4 bytes, depending upon the media on which the packet travels.

Figure 11:
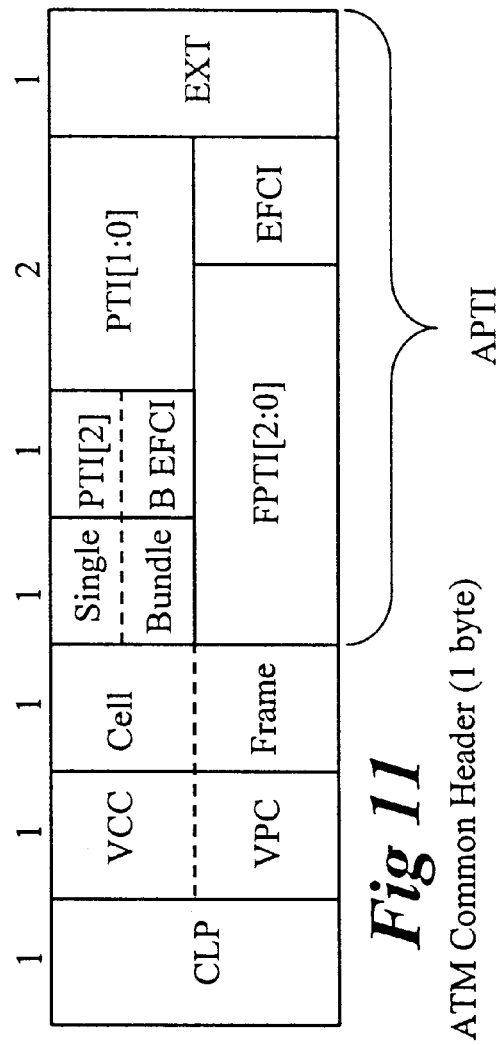
FIG. 11 shows ATM common header formats according to embodiments of the invention.

Referring to FIG. 11, the ATM Common Header is used to indicate the type of ATM payload carried in the MPLS packet. For example, it can indicate if the payload is of either VCC or VPC connections. It also indicates whether it carries a single cell, bundle cells, an AAL5 frame or a fragment of a frame. The field is one byte wide, according to one embodiment. It consists of the following fields:

(a) CLP (1 bit): ATM cell loss priority.
(b) VCC/VPC (1 bit): indicates if it is a VCC or VPC connection.
(c) Cell/Frame (1 bit): indicates it is a cell or frame (e.g., AAL5) format.
(d) APTI (5 bits): ATM payload type indicator which is defined based on Cell/Frame field.

Within APTI, there are following fields for either VCC or VPC connection:

For ATM cell format
(i) Single/Bundle (1 bit): This indicates if the payload carries a single cell or a bundle of cells.
(ii) PTI (PTI[2:0], 3 bits): Payload Type Indicator if it is a single cell.
(iii) PTI (PTI[1:0], 2 bits): Payload Type Indicator if it is a bundle of cells.
(iv) B EFCI (1 bit): Bundled EFCI (Explicit Forward Congestion Indicator). If bundled cells experience congestion, this bit is set. This bit is set by ORing with every user cell's EFCI in the bundle at segmentation time.
(v) EXT (1 bit): ATM common header extension. When set, a second octet ATM common header is formed. The second octet is currently undefined (it may be used to carry a Sequence Number and it may have an EXT bit defined).

For frame format:
(i) FPTI[2:0] (3 bits): Frame Payload Type Indicator: Following values are assigned:

0:BOM (Beginning of Message), 1:SSM (Single Segment Message), 2:SSM with UU/CPI, 3:SSM with padding and UU/CPI, 4:COM (Continuation of Message), 5:EOM (End of Message), 6:EOM with UU/CPI, 7:EOM with padding and UU/CPI.

(ii) EFCI (1 bit): ATM EFCI.

Figure 13:
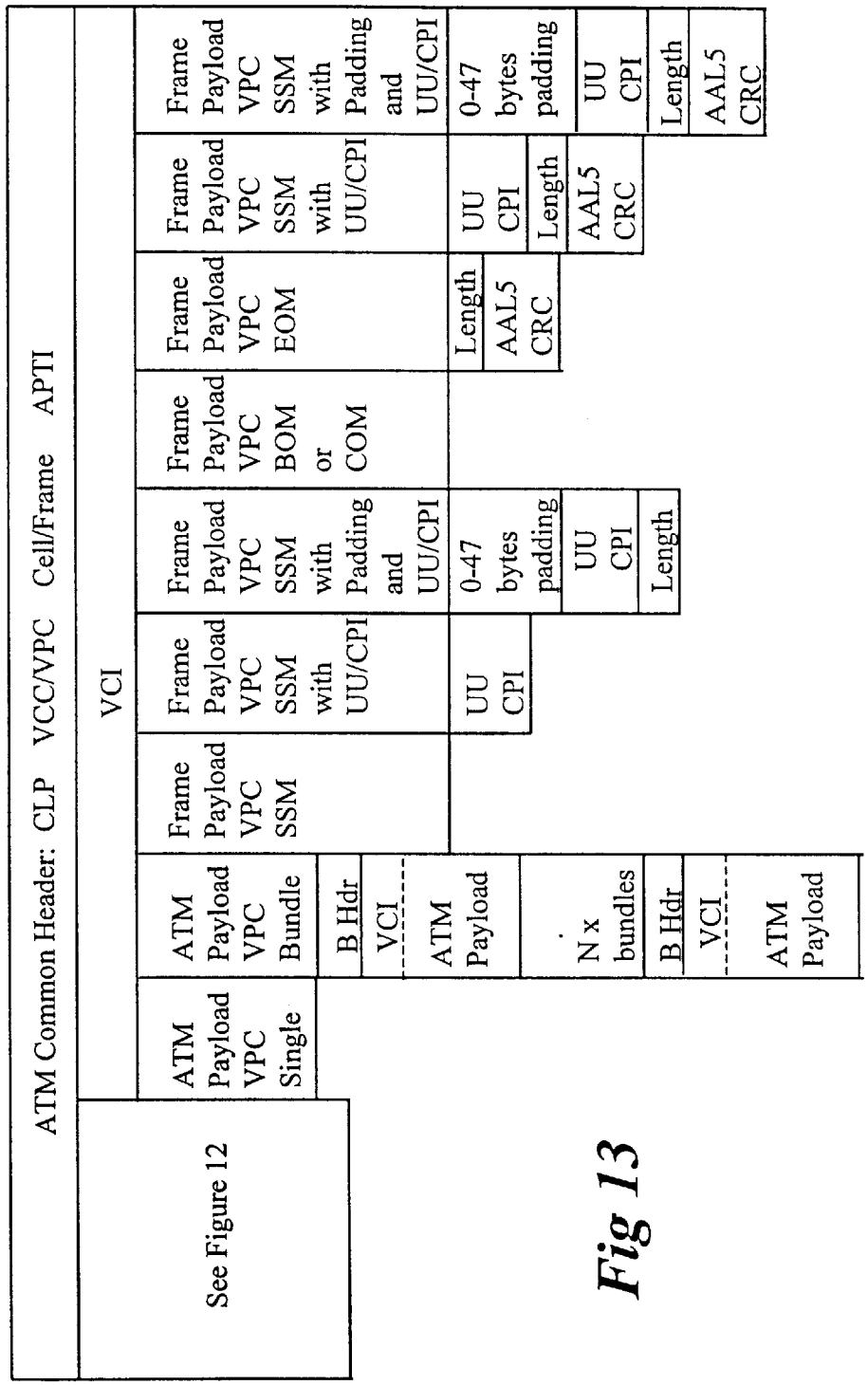

FIGS. 12 and 13 show a variety of ATM payload formats which can be packetized in accordance with embodiments of the invention. In the Figures, the common header is shown at the top and a variety of ATM payload formats are shown below it. As shown earlier, an ATM connection is made by the use of VPI and VCI. FIG. 13 therefore also shows cases where VCI must be included in the payload, if it is a VPC connection. In the case of bundle cells, VCI field can optionally be included in an ATM payload as shown in FIG. 13 by dotted lines.

Figure 14:
FIG. 14 shows an ATM bundle header formats according to embodiments of the invention.

When a plurality of ATM cell payloads are packetized in an MPLS packet, B Hdr (ATM bundle header) will be used to mark each ATM payload. FIG. 14 shows the bundle header format of one octet wide. In the Figure, CLP (1 bit) is an ATM CLP. VCI (1 bit) indicates if a 2 byte VCI field is inserted between the ATM Bundle Header and the Cell Payload. PTI (3 bits) is the ATM cell's payload type indicator. RES are reserved for future use.

In FIGS. 15–19, some examples of MPLS packet construction and datapath flows are shown in accordance with a few embodiments of the invention. In those Figures, a first MPLS node receives ATM cells at its ingress port and routes them to its appropriate egress port. The first MPLS node generates an MPLS labeled packet for transport to the ingress port of a second MPLS node using PPP. The second MPLS node segments the MPLS packet to ATM cells and routes them to appropriate egress ports. The encapsulation formats defer, depending on media (e.g., PPP, ATM, TDM etc.).

Figure 15:
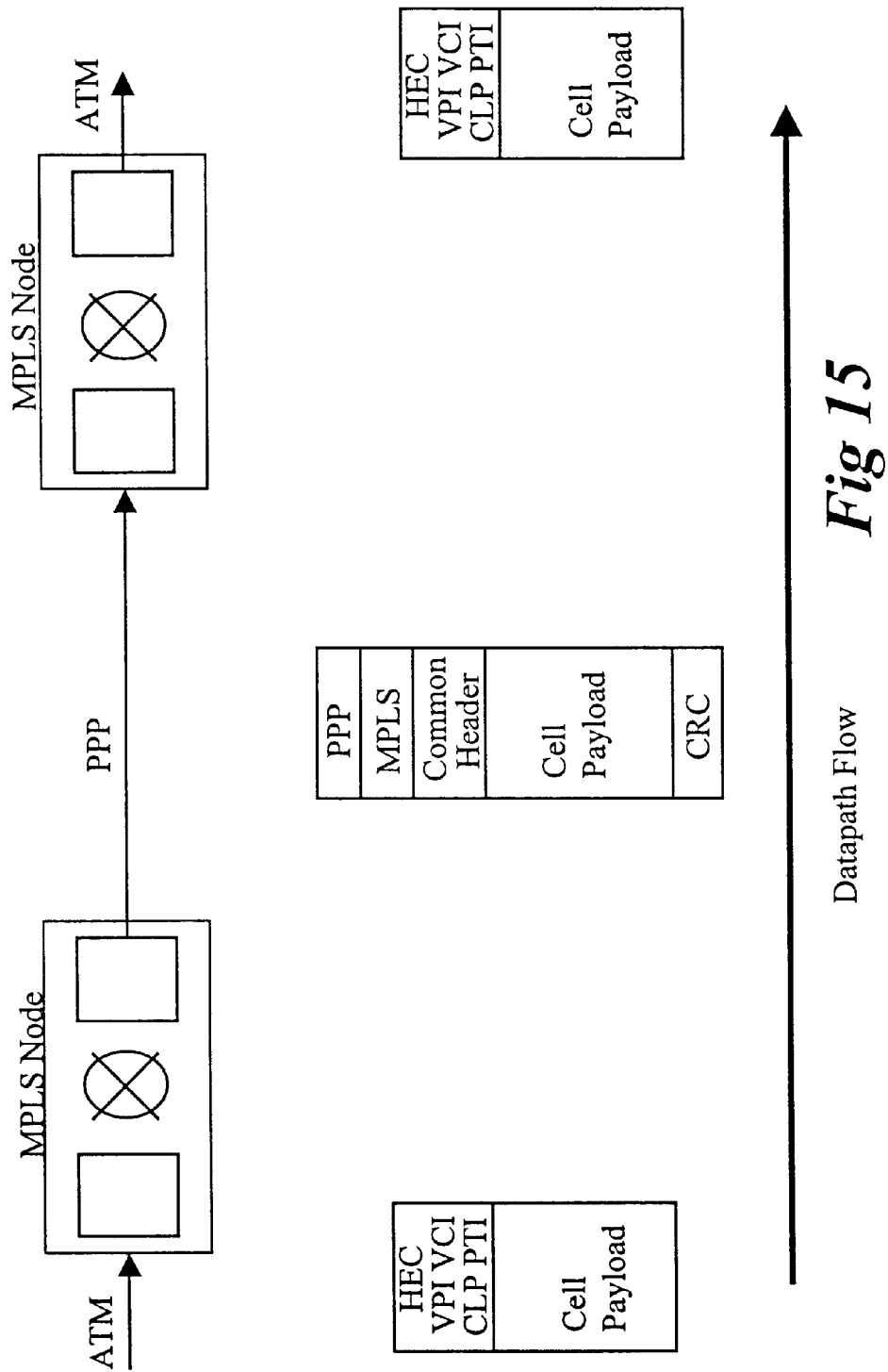
FIGS. 15, 16 and 17 show a datapath flow and MPLS packet construction in accordance with a few embodiments of the invention.
Figure 16:
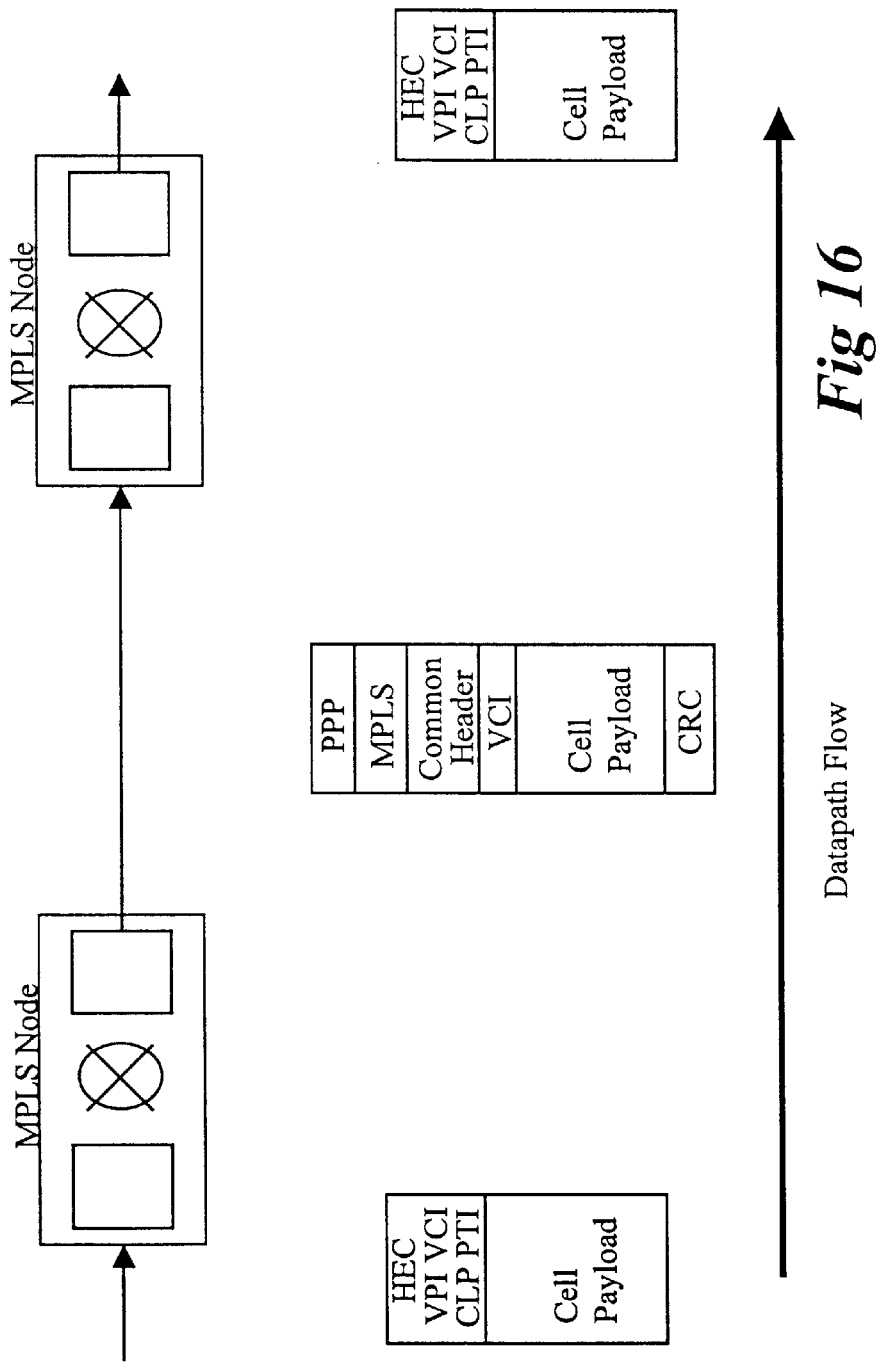
Figure 17:
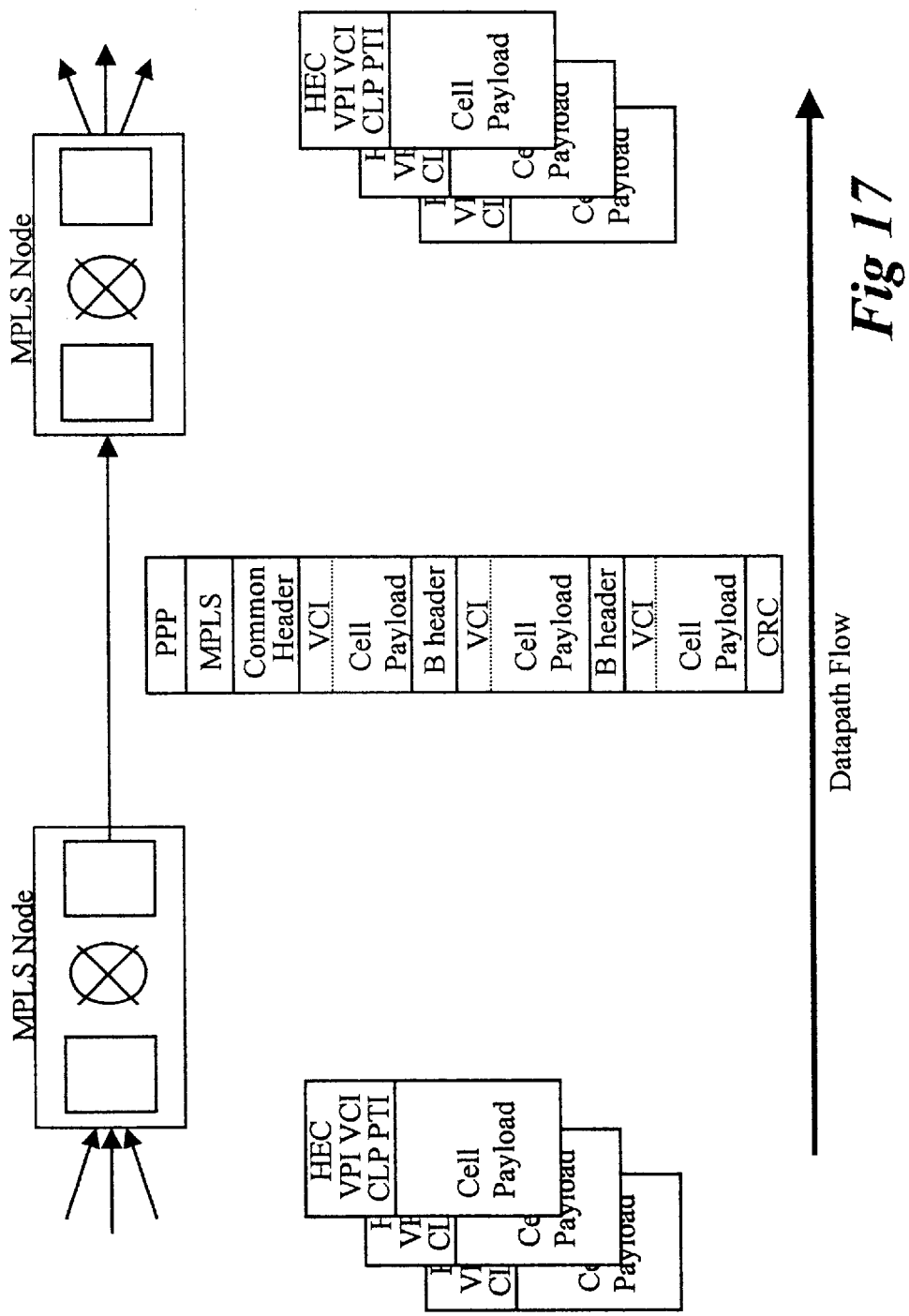

In FIG. 15, a single ATM cell is encapsulated (packetized) in PPP and MPLS for transport. An ATM common header is shown to contain CLP, VCC/VPC type and APTI. In FIG. 16, a VCI value is included in the payload. FIG. 17 shows a case in which ATM cells are bundled into an MPLS packet. Optional VCI fields in each bundled cell payload are shown in dotted lines.

Figure 18:
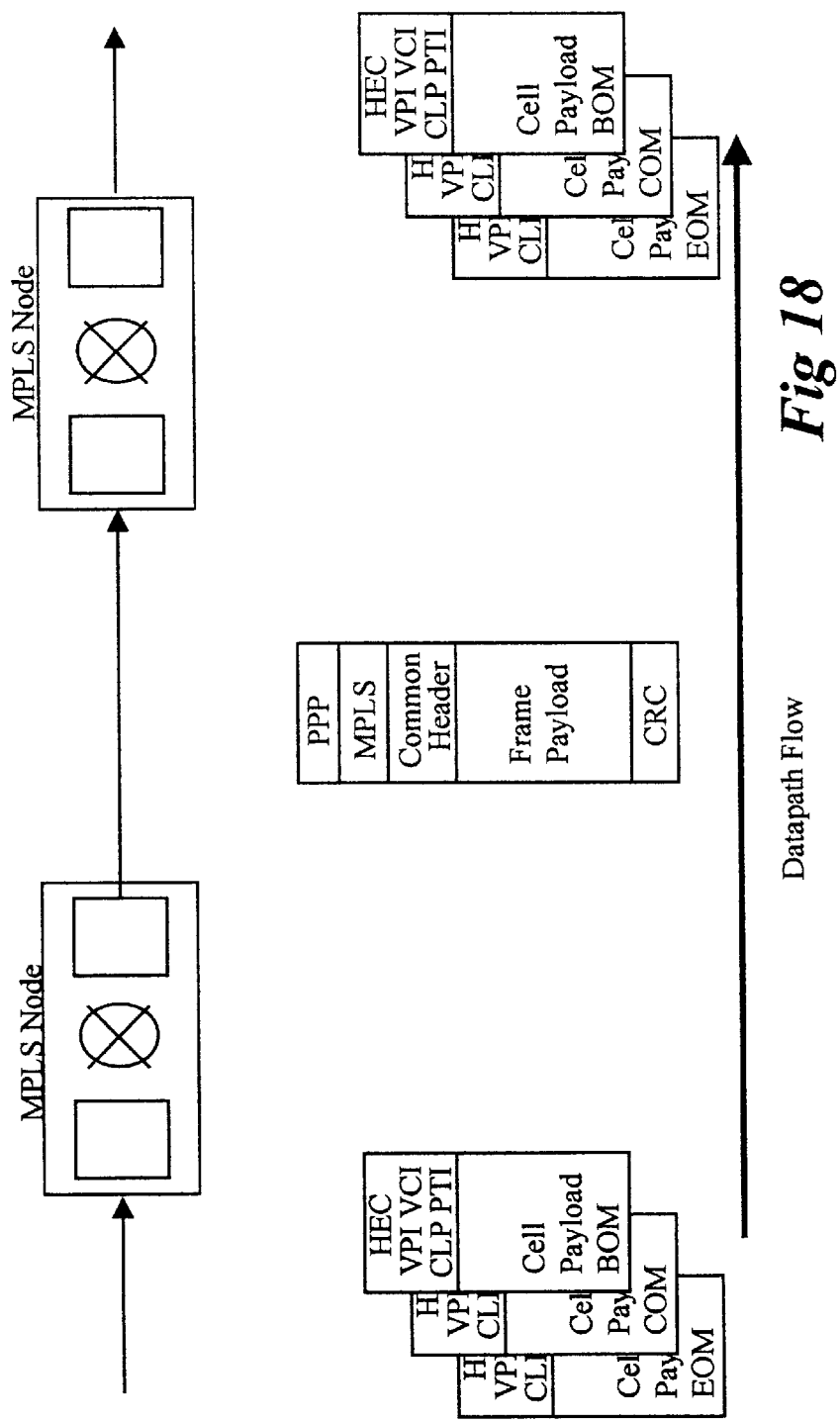
FIGS. 18 and 19 show a datapath flow and MPLS packets construction in accordance with a few embodiments of the invention in which ATM cells are of a frame data.
Figure 19:
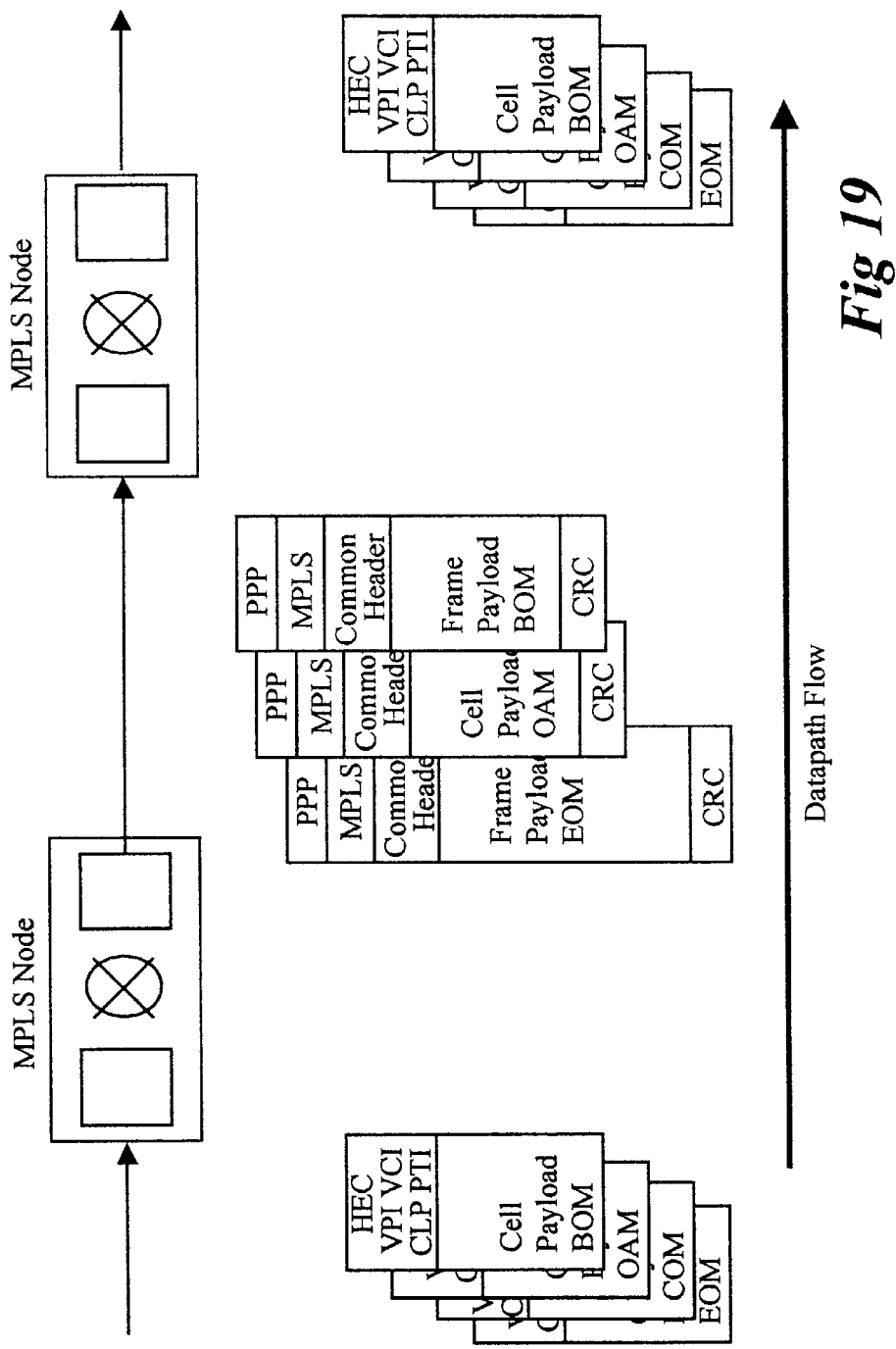

FIG. 18, on the other hand, shows where ATM cells are of a frame format, e.g., AAL5 frame. The frame payload of an MPLS frame is therefore a BOM, COM or EOM. FIG. 19 is similar to FIG. 18 except that one of the MPLS frames carries an ATM OAM cell payload. It also shows that the frame fragmentation has taken place but the cell order has been preserved.

Figure 20:
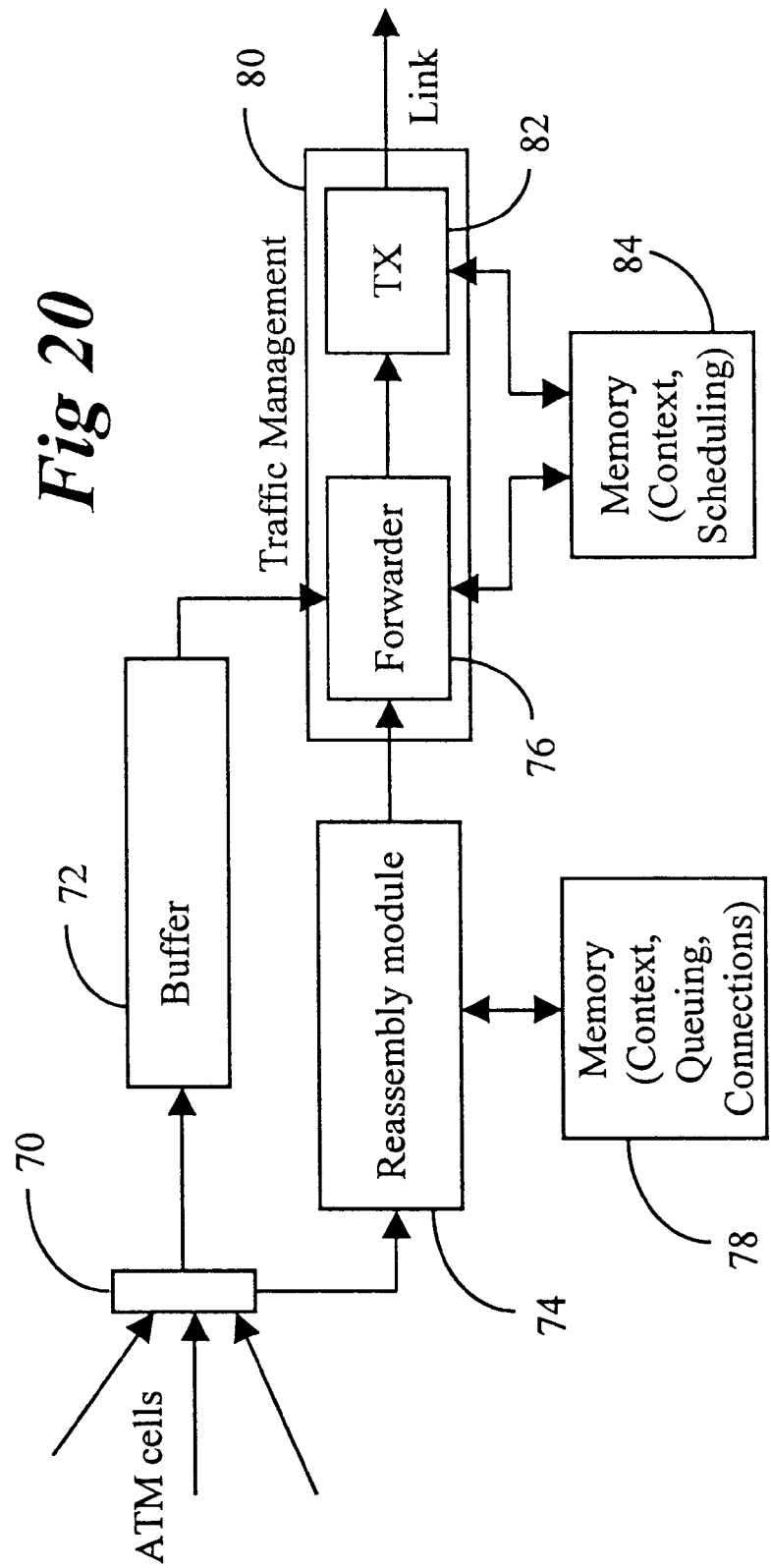
FIG. 20 is a block diagram of an MPLS node showing functions performed at a source node.

FIG. 20 is a block diagram of an MPLS node where ATM cells are reassembled to form an MPLS labeled packet for forwarding it to the next node through a link. The headers of received ATM cells are read at a header reader 70 and their payload is stored in queues in a buffer 72. According to information read from the headers, reassembly module 74 identifies connections, ATM payload types etc and creates ATM common headers. The ATM common header and locations of queues in which respective ATM payload is stored are sent to forwarder 76 which associates the ATM common header and its payload and contains a module which generates an MPLS labeled packet by attaching or assigning an MPLS label. As mentioned earlier, the MPLS label can be 0 byte long. A memory 78 at the reassembly module contains information relating to queuing and context of ATM process as well as information concerning ATM connections. Bundle headers are also created at the reassembly module. The forwarder 76 and transmitter/receiver (Tx/Rx) 80 form a traffic management block 82 and performs traffic management on the link by referring to a memory 84, such as scheduling and transporting, in addition to labelling. The memory 84 therefore contains information concerning scheduling, flow control and context of those processes such as MPLS labelling.

A mechanism like this will be needed by any box that wants to interwork ATM into MPLS.

As described referring to the embodiments, the present invention allows ATM cells to be formed into a self-describing MPLS packet. The MPLS packet carries necessary information concerning transmitting it over an MPLS domain to a proper destination MPLS node.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A method of transporting ATM cells between two nodes over a multiprotocol label switching domain, hereinafter called an MPLS domain, comprising steps of:

reading an ATM header to obtain attributes of an ATM cell received at a first node, the attributes of the ATM cell including a type of ATM payload, generating an ATM common header for the ATM cell, the ATM common header mapping the type of ATM payload and other attributes of the ATM cell, generating an MPLS labeled packet which includes the ATM common header and the ATM payload, the MPLS labeled packet containing routing information to a second node, and transmitting the MPLS labeled packet to the second node.

2. The method according to claim 1 wherein the attributes of the ATM cell further include an indication of whether the ATM payload is a cell payload or frame payload.

3. The method according to claim 2 wherein the ATM payload is a single cell payload, and the attributes of the ATM cell further include a cell payload type indicator.

4. The method according to claim 2 wherein the attributes of the ATM cell further include an indication that more than one cell payloads are bundled, further comprising steps of:

reading more than one ATM header received at a first node to obtain attributes of the cell payloads, generating an ATM common header for a first cell payload, the ATM common header mapping the attributes of the first cell payload, generating a bundle header for each of a second and succeeding cell payloads, the bundle headers mapping payload type indicators of the second and succeeding cell payloads, and generating an MPLS labeled packet which includes all the cell payloads, the ATM common header and bundle headers.

5. The method according to claim 4 wherein the attributes of the ATM cell further include a congestion indicator.

6. The method according to claim 5 wherein the congestion indicator is a bundle explicit forward congestion indicator.

7. The method according to claim 2 wherein the attributes of the ATM cell further include frame payload type indicators.

8. The method according to claim 7 wherein the frame payload type indicators include message types of ATM payload and existence of padding in the ATM payload.

9. The method according to claim 8 wherein the attributes of the ATM cell further include a congestion indicator.

10. The method according to claim 3 wherein VCI of the ATM header is included in the labeled packet.

11. The method according to claim 6 wherein VCI of the ATM header is included in the labeled packet.

12. The method according to claim 9 wherein VCI of the ATM header is included in the labeled packet.

13. The method according to claim 10 wherein the step of generating an MPLS labeled packet comprises a further step of:

generating an MPLS label of a predetermined length containing routing information to a second node.

14. The method according to claim 11 wherein the step of generating an MPLS labeled packet comprises a further step of:

generating an MPLS label of a predetermined length containing routing information to a second node.

15. The method according to claim 12 wherein the step of generating an MPLS labeled packet comprises a further step of:

generating an MPLS label of a predetermined length containing routing information to a second node.

16. The method according to claim 13 further comprising steps of:

encapsulating the labeled packet with PPP delimiter and CRC for transporting to the second node.

17. The method according to claim 14 further comprising steps of:

encapsulating the labeled packet with PPP delimiter and CRC for transporting to the second node.

18. The method according to claim 15 further comprising steps of:
   encapsulating the labeled packet with PPP delimiter and CRC for transporting to the second node.

19. A method of transporting one or more ATM cells over a multiprotocol label switching domain, hereinafter called an MPLS domain, comprising steps of:
   determining at a source node that the one or more ATM cells are of an AAL5 frame and are destined to a destination node of the MPLS domain,
   applying a common header to the payload of each ATM cell, the common header indicating attributes of each payload, the attributes of each payload including that the payload is a frame payload and a type of message of the payload,
   generating an MPLS labeled packet which includes the common header and the frame payload, the MPLS labeled packet mapping information concerning the destination node, and
   transmitting the MPLS labeled packet to the destination node.

20. The method according to claim 19 wherein the attributes of each payload further include the type of frame payload, padding and an explicit forward congestion indicator.

21. The method according to claim 20 wherein VCI of the ATM header is included in the MPLS labeled packet.

22. The method according to claim 21 further comprising steps of:
   encapsulating the MPLS labeled packet with PPP delimiter and CRC for transporting to the destination node.

23. The method according to claim 20 wherein the type of frame payload includes BOM, SSM, COM, and EOM.

24. The method according to claim 23 wherein the type of frame payload further includes SSM with UU/CPI, SSM with padding and UU/CPI, EOM with UU/CPI and EOM with padding and UU/CPI.

25. An apparatus for transporting ATM cells between two nodes over a multiprotocol label switching domain, hereinafter called an MPLS domain, comprising:
   an ATM header reader for reading an ATM header to obtain attributes of a received ATM cell, the attributes including a type of ATM payload,
   a reassembly module for generating an ATM common header for the ATM cell, the ATM common header mapping the type of ATM payload and other attributes of the ATM cell,
   a forwarder for generating an MPLS labeled packet which includes the ATM common header and the ATM payload, the MPLS labeled packet containing forwarding information to a second node, and
   a transmitter for transmitting the MPLS labeled packet to the second node.

26. The apparatus according to claim 25 wherein
   the ATM common header contains a field to indicate whether the ATM payload is a frame payload or a cell payload.

27. The apparatus according to claim 25 wherein
   the ATM common header contains fields to indicate the types of frame payload or cell payload.

28. The apparatus according to claim 25 wherein
   the ATM common header contains fields for ATM cell loss priority, and VCC/VPC indicator.

29. The apparatus according to claim 25 wherein
   the ATM common header contains a field to indicate a bundle cell payload and a field for a bundled explicit forward congestion indicator (hereinafter called BEFCI).

30. The apparatus according to claim 29 wherein the reassembly module generates a bundle cell header and the bundle cell header contains fields for ATM cell loss priority, to indicate the existence of VCI field and payload type indicator.

31. The apparatus according to claim 27 wherein
   the ATM common header contains a field for explicit forward congestion indicator (hereinafter called EFCI) and the types of frame payload include BOM, SSM, COM, and EOM.

32. The apparatus according to claim 31 wherein
   the types of frame payload further include SSM with UU/CPI, SSM with padding and UU/CPI, EOM with UU/CPI and EOM with padding and UU/CPI.

33. The apparatus according to claim 25 wherein
   the forwarder includes a module for generating an MPLS label of a predetermined length containing routing information to a second node.

34. The apparatus according to claim 30 wherein
   the forwarder includes a module for generating an MPLS label of a predetermined length containing routing information to a second node.

35. The apparatus according to claim 32 wherein
   the forwarder includes a module for generating an MPLS label of a predetermined length containing routing information to a second node.

36. A method for generating a multiprotocol label switching (MPLS) labeled packet suitable for transmitting one or more ATM cells between two nodes over an MPLS domain, the method comprising steps of:
   reading an ATM header to obtain attributes of an ATM cell received at a first node, the attributes of the ATM cell including a type of ATM payload,
   generating an ATM common header for the ATM cell, the ATM common header mapping the type of ATM payload and other attributes of the ATM cell, and
   generating an MPLS labeled packet which includes the ATM common header and the ATM payload, the MPLS labeled packet containing routing information to a second node.

37. The method according to claim 36 wherein the attributes of the ATM cell further include an indication of whether the ATM payload is a cell payload or frame payload.

38. The method according to claim 37 wherein the ATM payload is a single cell payload, and the attributes of the ATM cell further include a cell payload type indicator.

39. The method according to claim 37 wherein the attributes of the ATM cell further include an indication that more than one cell payloads are bundled, further comprising steps of:
   reading more than one ATM header received at a first node to obtain attributes of the cell payloads,
   generating an ATM common header for a first cell payload, the ATM common header mapping the attributes of the first cell payload,
   generating a bundle header for each of a second and succeeding cell payloads, the bundle headers mapping payload type indicators of the second and succeeding cell payloads, and
   generating an MPLS labeled packet which includes all the cell payloads, the ATM common header and bundle headers.

40. The method according to claim 39 wherein the attributes of the ATM cell further include a congestion indicator.

41. The method according to claim 40 wherein the congestion indicator is a bundle explicit forward congestion indicator.

42. The method according to claim 37 wherein the attributes of the ATM cell further include frame payload type indicators.

43. The method according to claim 42 wherein the frame payload type indicators include message types of ATM payload and existence of padding in the ATM payload.

44. The method according to claim 43 wherein the attributes of the ATM cell further include a congestion indicator.

45. The method according to claim 38 wherein VCI of the ATM header is included in the labeled packet.

46. The method according to claim 45 wherein the step of generating an MPLS labeled packet comprises a further step of:

generating an MPLS label of a predetermined length containing routing information to a second node.

47. The method according to claim 46 further comprising steps of:

encapsulating the labeled packet with PPP delimiter and CRC for transporting to the second node.

48. An apparatus for generating a multiprotocol label switching (MPLS) labeled packet suitable for transmitting one or more ATM cells between two nodes over an MPLS domain, the apparatus comprising:

an ATM header reader for reading an ATM header to obtain attributes of a received ATM cell, the attributes including a type of ATM payload, a reassembly module for generating an ATM common header for the ATM cell, the ATM common header mapping the type of ATM payload and other attributes of the ATM cell, and a forwarder for generating an MPLS labeled packet which includes the ATM common header and the ATM payload, the MPLS labeled packet containing forwarding information to a second node.

49. A computer readable medium storing instructions or statements for use in the execution in a computer of a method for generating a multiprotocol label switching (MPLS) labeled packet suitable for transmitting one or more ATM cells between two nodes over an MPLS domain, the method comprising steps of:

reading an ATM header to obtain attributes of an ATM cell received at a first node, the attributes of the ATM cell including a type of ATM payload, generating an ATM common header for the ATM cell, the ATM common header mapping the type of ATM payload and other attributes of the ATM cell, and generating an MPLS labeled packet which includes the ATM common header and the ATM payload, the MPLS labeled packet containing routing information to a second node.

50. The computer readable medium according to claim 49 wherein the attributes of the ATM cell further include an indication of whether the ATM payload is a cell payload or frame payload.

51. The computer readable medium according to claim 50 wherein the ATM payload is a single cell payload, and the attributes of the ATM cell further include a cell payload type indicator.

52. The computer readable medium according to claim 50 wherein the attributes of the ATM cell further include an indication that more than one cell payloads are bundled, further comprising steps of:

reading more than one ATM header received at a first node to obtain attributes of the cell payloads, generating an ATM common header for a first cell payload, the ATM common header mapping the attributes of the first cell payload, generating a bundle header for each of a second and succeeding cell payloads, the bundle headers mapping payload type indicators of the second and succeeding cell payloads, and generating an MPLS labeled packet which includes all the cell payloads, the ATM common header and bundle headers.

53. The computer readable medium according to claim 52 wherein the attributes of the ATM cell further include a congestion indicator.

54. The computer readable medium according to claim 53 wherein the congestion indicator is a bundle explicit forward congestion indicator.

55. The computer readable medium according to claim 50 wherein the attributes of the ATM cell further include frame payload type indicators.

56. The computer readable medium according to claim 55 wherein the frame payload type indicators include message types of ATM payload and existence of padding in the ATM payload.

57. The computer readable medium according to claim 56 wherein the attributes of the ATM cell further include a congestion indicator.

58. The computer readable medium according to claim 51 wherein VCI of the ATM header is included in the labeled packet.

59. The computer readable medium according to claim 58 wherein the step of generating an MPLS labeled packet comprises a further step of:

generating an MPLS label of a predetermined length containing routing information to a second node.

60. The computer readable medium according to claim 59 further comprising steps of:

encapsulating the labeled packet with PPP delimiter and CRC for transporting to the second node.

* * * * *